United States Patent [19]

Wagner et al.

[11] Patent Number: 5,755,846
[45] Date of Patent: May 26, 1998

[54] REGENERATIVE GLASS MELTING FURNACE WITH MINIMUM $NO_x$ FORMATION AND METHOD OF OPERATING IT

[75] Inventors: Manfred Wagner; Klaus Sorg; Helmut Pieper, all of Lohr am Main, Germany

[73] Assignee: Beteiligungen Sorg GmbH & Co. KG, Lohr am Main, Germany

[21] Appl. No.: 240,236

[22] Filed: May 10, 1994

Related U.S. Application Data

[63] Continuation-in-part of Ser. No. 11,608, Feb. 1, 1993, abandoned.

[30] Foreign Application Priority Data

Jun. 6, 1992 [DE] Germany ............... 42 18 702.8

[51] Int. Cl.[6] .................................................. C03B 5/16
[52] U.S. Cl. .................. 65/134.4; 65/136.3; 65/335; 65/337; 432/180; 431/2
[58] Field of Search ................ 65/134.4, 136.3, 65/335, 337, 347, 160; 432/19, 23, 180, 179, 181; 431/2, 5

[56] References Cited

U.S. PATENT DOCUMENTS

| | | |
|---|---|---|
| 3,592,623 | 7/1971 | Shepherd ................ 65/337 |
| 3,954,433 | 5/1976 | Holler . |
| 4,347,072 | 8/1982 | Nagaoka et al. . |
| 4,391,581 | 7/1983 | Daman et al. . |
| 4,599,100 | 7/1986 | Demarest, Jr. ................ 65/134.4 |
| 4,846,665 | 7/1989 | Abbasi . |
| 5,395,416 | 3/1995 | Pieper ................ 65/347 |
| 5,522,721 | 6/1996 | Drogue et al. . |

FOREIGN PATENT DOCUMENTS

| | | |
|---|---|---|
| 0306658 | 3/1989 | European Pat. Off. . |
| 0335728 | 10/1989 | European Pat. Off. . |
| WO/90/04571 | 5/1990 | WIPO . |

OTHER PUBLICATIONS

Ceramic Engineering and Science Proceedings 5 (1984) Jan.—Feb.

Evaluation of $NO_x$ Emissions on a Pilot-Scale Furnace, presented at 44th Annual Conference on Glass Problems—Nov. 1983, pp. 31–38.

Primary Examiner—Steven P. Griffin
Attorney, Agent, or Firm—Hill Steadman & Simpson

[57] ABSTRACT

A method of operating a regenerative glass melting furnace with end-firing or cross-firing utilizes burners to provide sub-stoichiometric combustion and super-stoichiometric combustion along the sidewalls or transverse walls of the furnace and equipment associated with the method. Fuel supply is controlled so that overall combustion is stoichiometric.

23 Claims, 4 Drawing Sheets

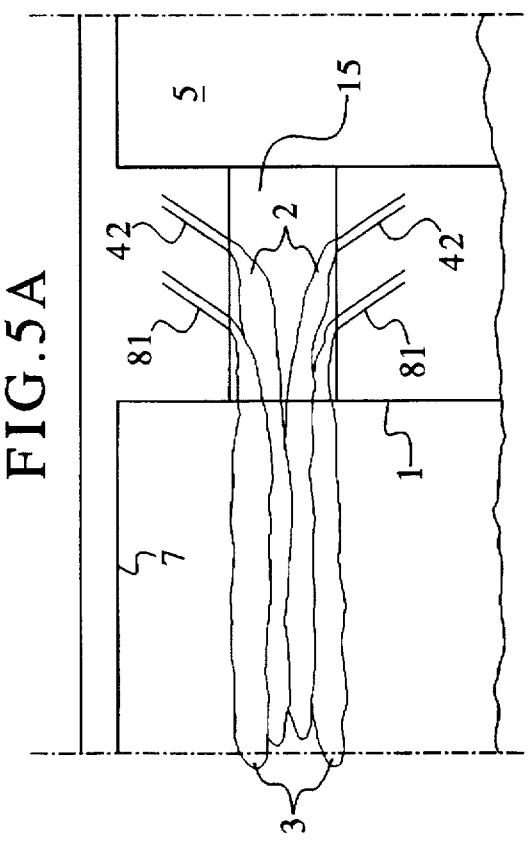
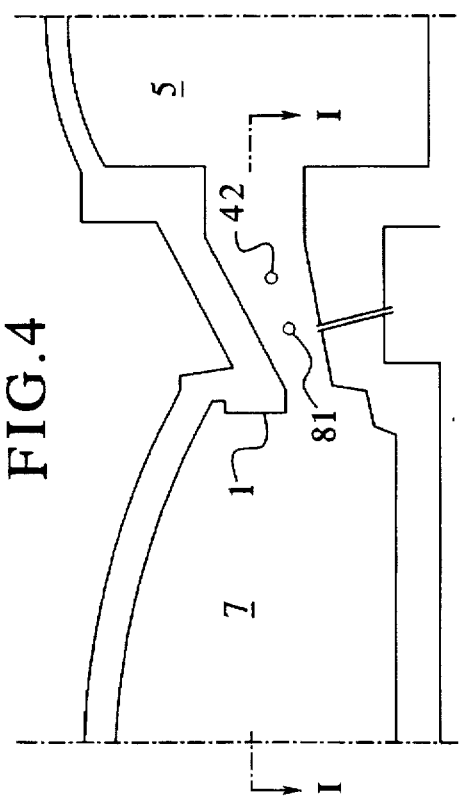
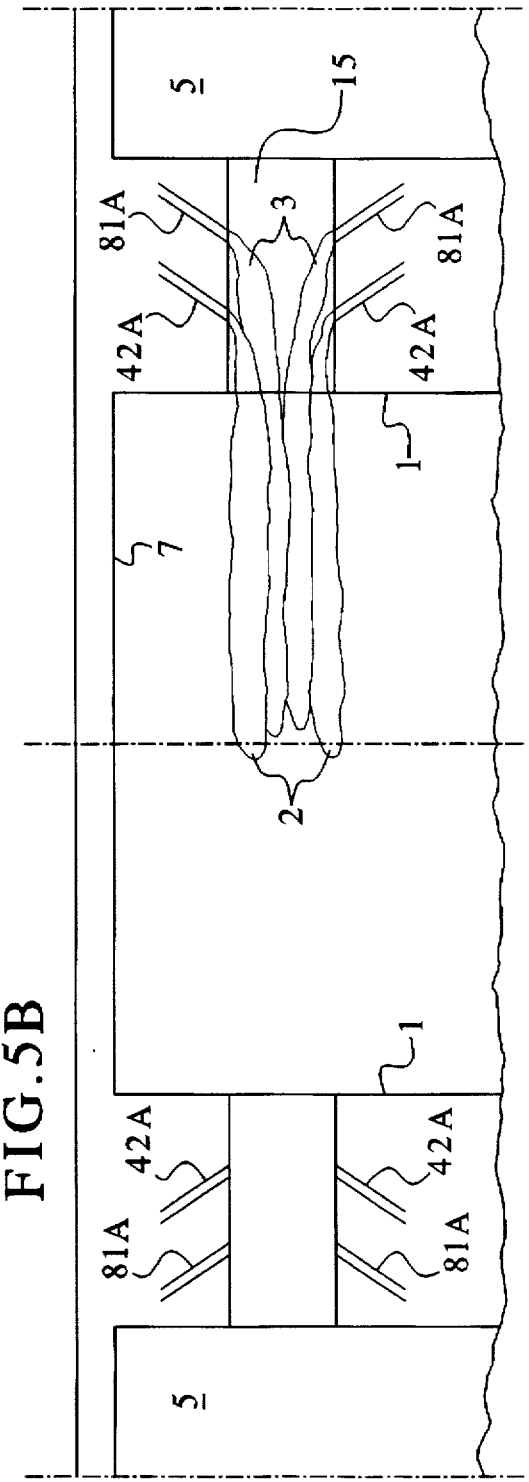

REGENERATIVE GLASS MELTING FURNACE WITH MINIMUM NO$_x$ FORMATION AND METHOD OF OPERATING IT

This application is a continuation-in-part of now abandoned application Ser. No. 08/011,608 filed on Feb. 1, 1993 entitled "REGENERATIVE GLASS MELTING FURNACE WITH MINIMUM NO$_x$ FORMATION", inventors M. Wagner, K. Sorg, and H. Pieper.

BACKGROUND OF THE INVENTION

The invention relates to a glass melting furnace in which the combustion waste gases heat the combustion air in regenerators, the burners associated with each regenerator are switched on and off alternately, and the burners are arranged in two areas, and to a method for operating such as furnaces.

Such furnaces have long been known and have proven very successful. However they have the disadvantage of having a relatively high and often unacceptable level of NO$_x$ emission.

The formation of nitrogen oxides in glass melting furnaces is aided by the fact that very high temperatures, on the order of 2000° C. and more, occur in the flame core. However, the high temperatures are necessary to achieve the required level of thermal efficiency necessary for high melting rates.

To overcome the disadvantageously high NO$_x$ level in the waste gas, a method and device are known from U.S. Pat. No. 4,347,072 to Nagaoka et al for reducing NO$_x$ content in the waste gas generated in a glass melting furnace of cross-firing or end-firing type equipped with a heat recovering device. The disclosed apparatus and method comprise supplying hydrocarbons in a counterflow to that of the combustion waste gas or from the corners of the combustion chamber into the combustion chamber over the melting tank, without supplying sufficient additional oxygen for burning the supplied hydrocarbons, so as to effect the reducing reaction of the NO$_x$ in the combustion waste gas.

In the aforementioned patent the hydrocarbons like kerosene or heavy fuel oil are supplied against the flow of waste gas with the additional burners for these hydrocarbons arranged at the outlet of the waste gas stream from the glass basin, i.e., the inlet to a regenerator.

Therefore the thermal efficiency is impaired, as the thermal energy of the supplied hydrocarbons is not efficiently used for melting the glass batch. In addition, a formation of CO occurs which has detrimental effects on the checkers.

SUMMARY OF THE INVENTION

It is therefore an object of the invention to produce a regenerative glass melting furnace which will combine a high melting rate with a relatively low NO$_x$ emission and which will have a high concentration of energy in the doghouse area (where batch is introduced), but in which the flame core temperatures will be considerably reduced, and a method for operating it.

In the aforementioned parent patent application, which is incorporated herein by reference, this object is achieved by operating the burners in one plane sub-stoichiometrically (rich) and in the other super-stoichiometrically (lean) and subjecting the combustion gases in a mixing zone to afterburning under stoichiometric conditions. The term "sub-stoichiometric" and "super-stoichiometric" refers always to the flame core.

The sub-stoichiometric combustion is advantageously performed at a higher elevation (in the burner port) and the super-stoichiometric combustion at a lower elevation, for example in the form of underport firing.

The sub-stoichiometric combustion in the flame core of the auxiliary burner is achieved by using a low impulse burner, and in doing so, the flame core is enriched with fuel though it takes place in a surrounding with high oxygen content. The waste gas is then mixed with the rest of the air to supply the main burner having a higher impulse in order to keep the flame length adequate. In the core of the main flame the conditions are super-stoichiometric at an oxygen percentage lower than 21 percent. Consequently both flames have a lower core temperature than the original flame.

To obtain low impulse mixing it is advantageous to introduce fuel gas in the upper area into the side of the port neck, and to achieve an impulse mixing not higher than necessary to keep the flame length adequate. The combustion in the lower furnace area is provided by underport firing.

By the proposed measures, according to the parent patent application mentioned, the NO$_x$ emissions in regenerative glass melting furnaces can be considerably reduced without the need for heavy investment. However, the proposed methods and device relate to furnaces of the end-firing type only.

Continuing work in the glass melting field has resulted in the present invention which allows the achievement of both low NO$_x$ emissions and high thermal efficiency in the melting process also for glass melting furnaces of the cross-firing type.

With the present invention the regenerators are positioned along both sidewalls of the batch section with the associated port necks are extending in a direction perpendicular to the sidewalls.

The burners are positioned in two areas associated with the port necks, with at least one first burner being operated super-stoichiometrically and at least one second adjacent burner being operated sub-stoichiometrically, with the burners controlled such that the overall combustion in the furnace is stoichiometrical.

The position of the first and second burners in a first embodiment of the invention is such that the first burner is positioned below the port neck and the second burner is positioned in the bottom wall of the port neck.

In a second embodiment of the invention, the first and second burners are positioned in a sidewall of the port neck, spaced apart, with the second burner located upstream of the first burner.

In a third embodiment of the invention, both the first and the second burner are positioned in a port neck, with the first burner positioned in the top wall of the port neck and the second burner in a sidewall thereof.

3

FIG. 4 is a diagrammatic, vertical cross-section through a glass melting furnace according to a second embodiment of the present invention.

FIG. 5A is a section through FIG. 4 along the line I—I.

FIG. 5B is a diagrammatic, horizontal cross-section through a glass melting furnace according to an alternate second embodiment of the present invention.

Figure 6A:
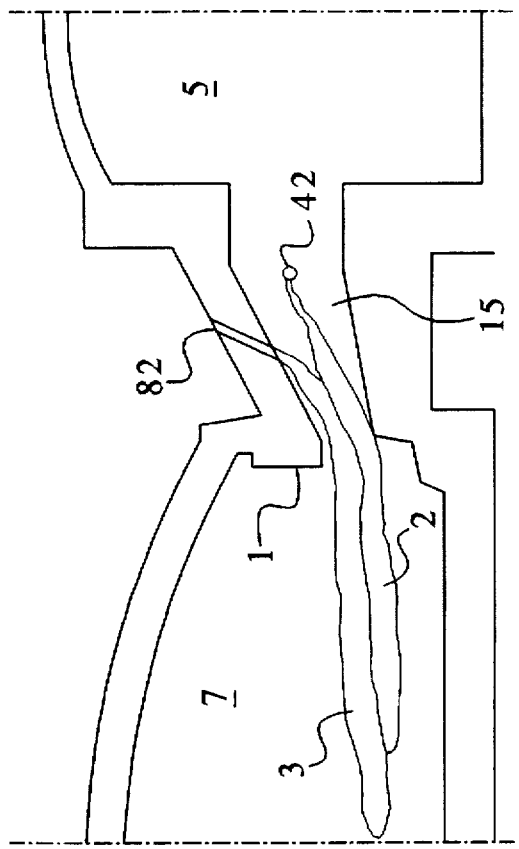

FIG. 6A is a diagrammatic, vertical cross-section through a glass melting furnace according to a third embodiment of the present invention.

Figure 6B:
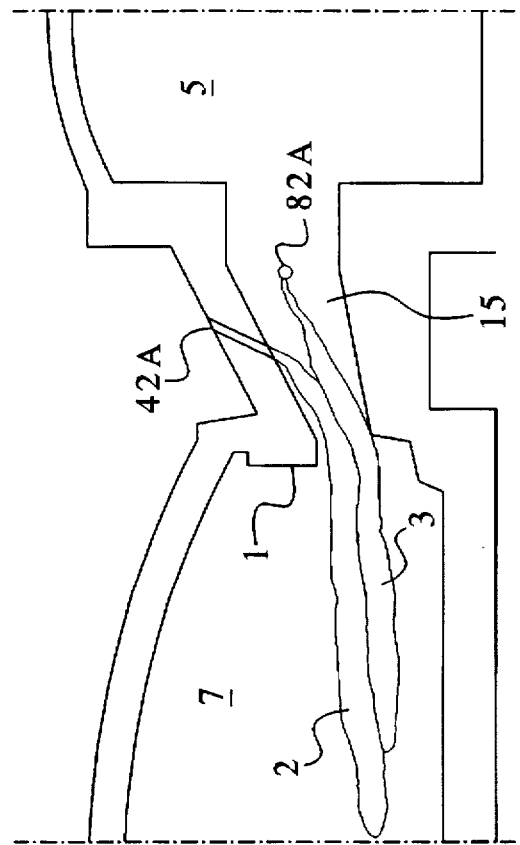

FIG. 6B is a diagrammatic, vertical cross-section through a glass melting furnace according to an alternate third embodiment of the present invention.

DETAILED DESCRIPTION OF THE PREFERRED EMBODIMENTS

Figure 1:
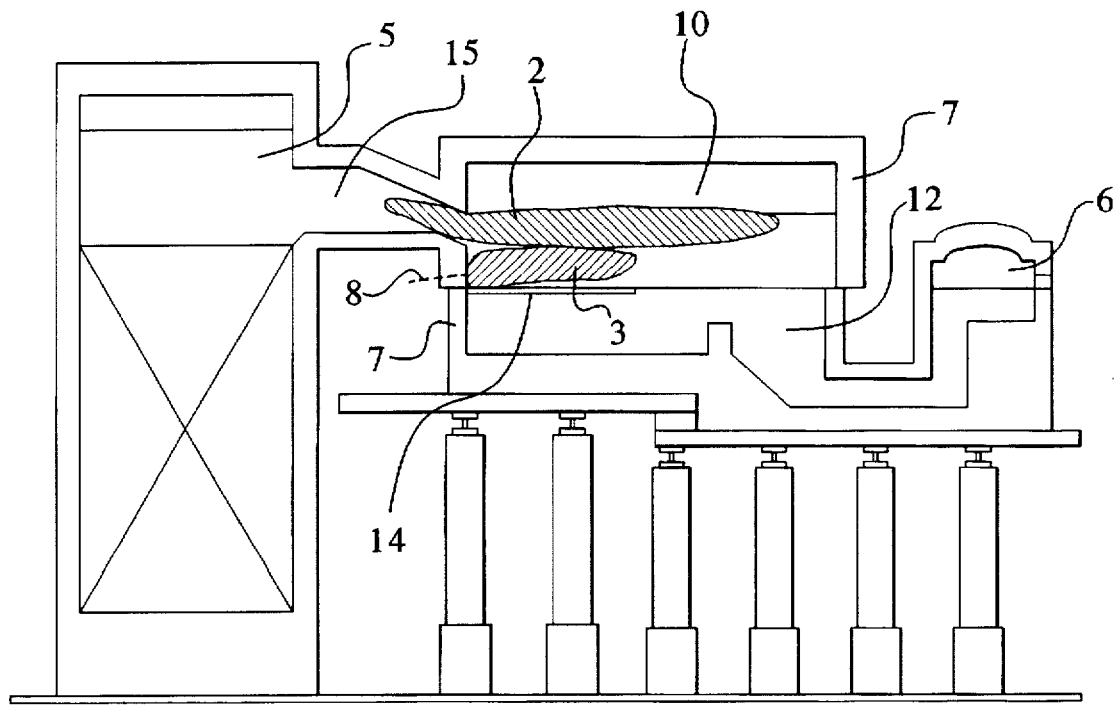
FIG. 1 is a diagrammatic, vertical longitudinal section through a glass melting furnace according to the disclosure of the parent patent application Ser. No. 08/011,608, filed Feb. 1, 1993, now abandoned.
Figure 2:
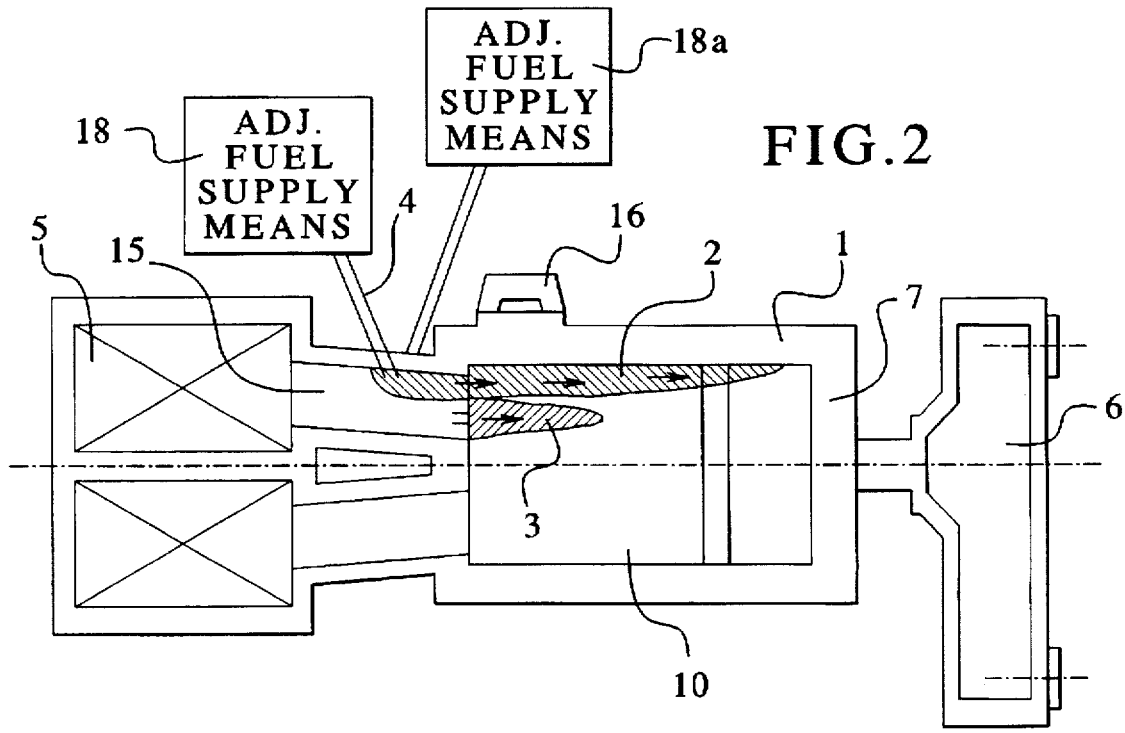
FIG. 2 is a horizontal section through the furnace of FIG. 1.

With reference to FIGS. 1 and 2, the furnace is a conventional regenerative furnace with end-firing comprising sidewalls 1, transverse walls 7, regenerators 5, and a working end 6. The sidewalls 1 and transverse walls 7 define a batch section or basin 10 for receiving and containing molten glass 12 at least partially covered with batch 14. The regenerators 5 communicate with the batch section or basin 10 through an associated port neck 15. Burners 4, 8 are associated with each regenerator 5 and port neck 15 and are switched on and off alternately.

The method according to the parent patent application mentioned combines an existing underport firing with laterally installed burners such that the advantage of the high energy concentration in the area of the doghouse 16 is even increased, but on the other side, the flame temperatures in the core are lowered considerably.

The method of operating the furnace is such that the velocity in a burner 4 laterally inserted in a port neck is made so low that the fuel gas has a very low mixing impulse and therefore very little mixing occurs in the port neck. Consequently an area 2 of highly sub-stoichiometric combustion develops, which is always opposite the exhaust side, so that no unburned fuel gas enters the exhaust area.

At the same time, the existing underport firing is retained, although one or more burners 8 situated near the center can be shut off. The remaining burners 8 of the underport firing are in communication with the basin 10 and operate in a super-stoichiometric area 3, i.e., with a relatively great excess of air. Here the flame core is cooled by the great excess of air, so that overall a substantially lower $NO_x$ emission is achieved.

By this configuration the $NO_x$ content of the exhaust of an existing end-fired regenerative furnace can be lowered by about 50% with the same furnace performance.

The velocities of the underport firing and of the firing in the port neck are made such that the sub-stoichiometric area and the super-stoichiometric area are relatively narrowly defined and the flue gas streams mix again in the rest of the furnace superstructure so that in the draft part of the furnace no excessive carbon monoxide concentration can be measured in the flue gas, i.e., an overall stoichiometric combustion is present.

By varying the fuel gas flows in the two burner systems, through the use of first and second adjustable fuel supplies 18 and 18a, which act as control means for the respective burners, the flame length can be varied, and the energy concentration in the furnace can be shifted forward and backward, and thus can be adapted to the loading of the furnace.

4

The same advantages are achieved in the present invention, wherein a conventional regenerative furnace with cross-firing is used.

With reference to FIGS. 3A–6B, embodiments of the present invention are illustrated with the same numerals used for the same elements as in FIGS. 1 and 2.

Figure 3A:
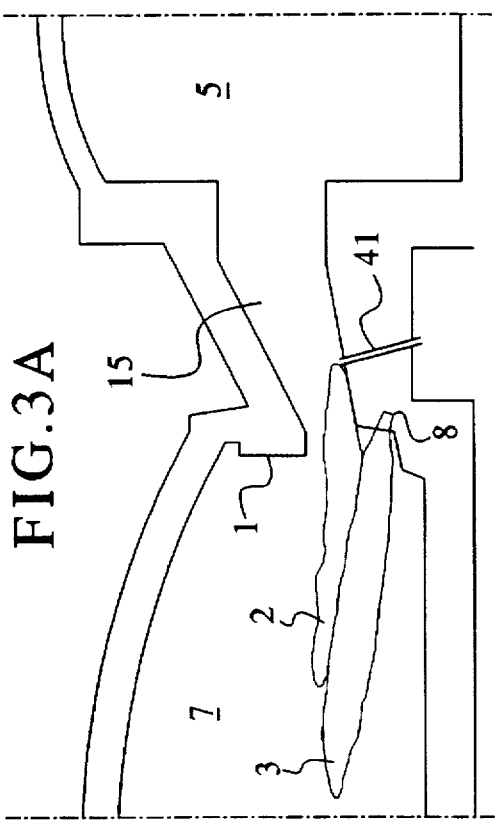
FIG. 3A is a diagrammatic, vertical cross-section through a glass melting furnace according to a first embodiment of the present invention.
Figure 3B:
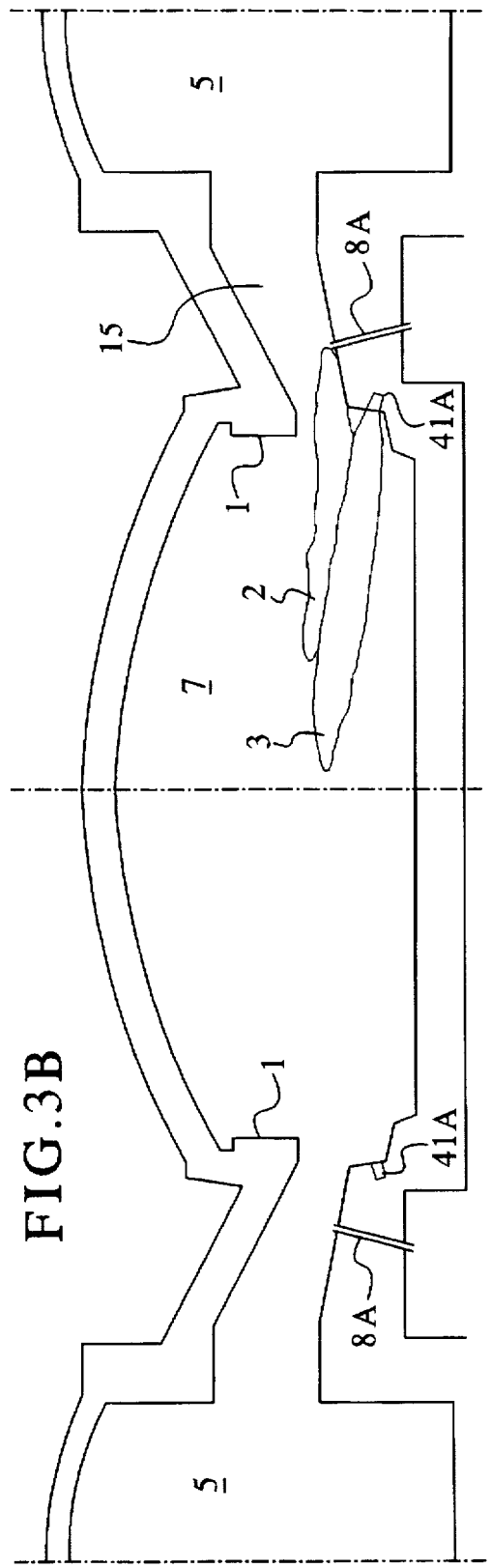
FIG. 3B is a diagrammatic, vertical cross-section through a glass melting furnace according to an alternate first embodiment of the present invention

In a first embodiment illustrated in FIG. 3A, the burner 8 is provided for super-stoichiometric combustion resulting in the area 3 of highly super-stoichiometric combustion being underneath the area 2 of sub-stoichiometric combustion, resulting from a low impulse burner 41 provided for that purpose and located in the bottom wall of the port neck forming a passage from the regenerator 5 and the furnace with the sidewall 1 and the one transverse wall 7 indicated alternatively, as shown in FIG. 3B, a burner 8a is provided for super-stoichiometric combustion resulting in the area 3 of highly super-stoichiometric combustion being above the area 2 of the sub-stoichiometric combustion, resulting from a low impulse burner 41Aa provided for that purpose and located under the port neck forming a passage for the regenerator 5 and the furnace.

Consequently, the areas 2 and 3, which mix and provide for overall stoichiometric combustion, same as in the mentioned parent patent application, extend across the glass basin, and the waste gas leaves through a regenerator 5 opposite to the illustrated regenerator 5 as shown in FIG. 3B.

The area 3 is inclined upwards in this first embodiment. As shown in FIG. 3, the first and second flame cores in areas 2 and 3 extend in generally parallel direction, with respect to each other, from the port neck 1 towards the batch section 7. In this embodiment and also in the second and third embodiment which will be described later, there is a gas supply provided for the burner 41 at a low velocity to achieve low impulse burning resulting in sub-stoichiometric combustion.

Likewise there is a fuel gas supply provided for the burner 8 at a high velocity to achieve high impulse burning resulting in super-stoichiometric combustion.

It is obvious that a plurality of burners 8 and 41 are provided in the furnace and that only one of each is shown.

Now with reference to FIG. 4, a second embodiment of the present invention is illustrated wherein the furnace is the same as in FIG. 3A. The difference as to the first embodiment is that both burners, i.e., the one for sub-stoichiometric and the other for super-stoichiometric combustion are installed at the same sidewall of a port neck in such a way, that a burner 81 provided for super-stoichiometric combustion is spaced downstream of a burner 42 provided for sub-stoichiometric combustion. The term "downstream" or "upstream" is related to the stream of air from the regenerator 5 to the furnace. In this case, the burner 42 has a fuel gas supply at low velocity like the burner 41 in the previous embodiment, whereas the burner 81 corresponds with the burner 8 in this respect.

FIG. 5A illustrates the extension of the areas 2 and 3 and it is noteworthy that in the port neck shown, two burners 42 and two burners 81 are positioned opposing each other, resulting in flame areas about perpendicular to the sidewall 1 alternatively, as shown in FIG. 5B, a burner 42A provided for sub-stoichiometric combustion is spaced downstream of a burner 81A provided for super-stoichiometric combustion.

Finally, FIG. 6A illustrates a third embodiment wherein the same furnace is used as in the two preceding embodiments.

In FIG. 6, a burner 82 provided for super-stoichiometric combustion is positioned in the top wall of a port neck, and the burner 42 for sub-stoichiometric combustion is positioned laterally in the port neck as in the second embodiment. In the third embodiment, the area 3 of super-stoichiometric combustion is above the area 2 of sub-stoichiometric combustion, as in the parent patent application mentioned, however, the flame direction is different alternatively, as shown in FIG. 6B, the area 3 of super-stoichiometric combustion from burner 82a is below the area 2 of sub-stoichiometric combustion.

It is obvious, that in all three embodiments of the present invention, there is a mixing and afterburning zone for mixing and burning waste gases to result in almost stoichiometric combustion in the glass basin with the method and the furnace according to the invention leading to a minimum $NO_x$ emission.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method of operating a cross-firing or end firing glass melting furnace, comprising a batch section having opposed sidewalls, a pair of regenerators, a pair of port necks which provide combustion air from respective regenerators to said batch section, and at least one burner at each of an upper level area and a lower level area associated with each port neck, said method comprising the steps of:

operating said burners associated with one port neck alternately with said burners of the other port neck;

operating said at least one burner at said upper level area by low impulse firing and sub-stoichiometrically to provide a first flame core with an oxygen lean exhaust gas;

operating said at least one burner at said lower area by high impulse firing and super-stoichiometrically to provide a second flame core with an oxygen rich exhaust gas; and controlling said burners and providing mixing and after burning of said exhaust gases within said furnace so that overall combustion in said furnace is stoichiometric.

2. The method of claim 1 wherein said second flame core has an oxygen percentage less than 21%.

3. The method of claim 1 wherein said first flame core and said second flame core extend in a generally parallel direction, with respect to each other, from said port necks towards said batch section.

4. The method of claim 1 in which said at least one burner at said upper level area and said at least one burner at said lower level area are adjacent.

5. The method of claim 1 in which said at least one burner at said upper level area is positioned within said port neck, and said at least one burner at said lower level area comprises an underpart burner.

6. The method of claim 5 in which said at least one burner at said upper level area is provided at a side wall of said port neck.

7. The method of claim 1 in which said at least one burner at said upper level area is provided at an upper wall of said port neck.

8. A method of operating a cross-firing glass melting furnace, said furnace comprising:

a batch section having a first sidewall and a second opposed sidewall;

a pair of regenerators, a regenerator of said pair of regenerators associated with said first sidewall and the other regenerator of said pair of regenerators associated with said second sidewall;

a pair of port necks, a port neck of said pair of port necks associated with said first sidewall and the other port neck of said pair of port necks associated with said second sidewall and each port neck of said pair of port necks respectively providing combustion air from one regenerator of said pair of regenerators to said batch section;

an underport burner associated with each port neck of said pair of port necks for alternately providing flame in said batch section below each port neck of said pair of port necks, and a burner in a bottom wall of each port neck of said pair of port necks for alternately providing flame in a direction towards the opposed sidewall; and said method comprising the steps of:

operating said burner in one of said port necks of said pair of port necks sub-stoichiometrically to provide a first flame core with an oxygen lean exhaust gas;

operating said underpart burner below said one of said port necks of said pair of port necks super-stoichiometrically to provide a second flame core with an oxygen rich exhaust gas; and controlling said burners and providing mixing and after burning of said exhaust gases within said furnace so that overall combustion in said furnace is stoichiometric.

9. The method of claim 8 wherein the step of operating said underport burner is by means of high impulse firing and the step of operating said burner in one of said port necks of said pair of port necks is by means of low impulse firing.

10. The method of claim 8 wherein said second flame core has an oxygen percentage less than 21%.

11. A glass melting furnace comprising:

a basin for containing molten glass at least partially covered with batch;

a pair of regenerators;

a pair of port necks, each port neck of said pair of port necks providing combustion air from one regenerator of said pair of regenerators to said basin;

first burner means provided at each port neck of said pair of port necks for providing sub-stoichiometric combustion in a first flame core within said basin;

second burner means at each port neck of said pair of port necks for providing super-stoichiometric combustion in a second flame core within said basin; and control means for controlling said first and second burner means in order to provide within said basin a mixing and after burning zone for mixing and burning waste gases from said first and second flame cores to result in stoichiometric combustion throughout said basin outside of said first and second flame cores.

12. The glass melting furnace of claim 11 in which said first burner means is provided at an upper level area at a higher elevation than said second burner means which is provided at a lower level area.

13. The glass melting furnace of claim 12 in which first fuel gas supply means are operatively associated with said first burner means for providing said first burner means with a low velocity gas supply to achieve low impulse burning within said first flame core.

14. The glass melting furnace of claim 12 in which a second fuel gas supply means is operatively associated with said second burner means for providing said second burner means with a high velocity gas supply to achieve high impulse burning within said second flame core.

15. The glass melting furnace of claim 11 in which said second flame core has an oxygen percentage of less than 21%.

16. The glass melting furnace of claim 11 in which said second burner means comprises at least one underport burner.

17. The glass melting furnace of claim 16 in which said first burner means is positioned at a side wall of each port neck of said pair of port necks.

18. The glass melting furnace of claim 11 in which said first burner means is positioned in an upper wall of each port neck of said pair of port necks.

19. The glass melting furnace of claim 11 in which said first burner means comprises at least one first burner positioned in a side wall of each port neck of said pair of port necks and said second burner means comprises at least one second burner positioned in said side wall of each port neck of of said pair of port necks, said at least one first burner being positioned upstream, in a direction toward the regenerator, to said at least one second burner.

20. The glass melting furnace of claim 11 in which said first and second burner means are positioned adjacent to each other.

21. The glass melting furnace of claim 11 in which said second burner means provides said second flame core such that said second flame core projects upwardly.

22. The glass melting furnace of claim 11 in which said first burner means provides said first flame core such that said first flame core projects downwardly.

23. The glass melting furnace of claim 11 in which said first and second burner means provide said first and second flame core in a generally parallel direction, with respect to each port neck other, and extending from each of said pair of port necks towards said basin.

* * * * *